US010374739B2

(12) United States Patent
Cai et al.

(10) Patent No.: US 10,374,739 B2
(45) Date of Patent: Aug. 6, 2019

(54) CONTROLLER, ACCESS NODE AND AGGREGATION NODE IN A RADIO COMMUNICATION NETWORK

(71) Applicant: HUAWEI TECHNOLOGIES CO., LTD., Shenzhen, Guangdong (CN)

(72) Inventors: Tao Cai, Kista (SE); Yinggang Du, Shenzhen (CN); Mario Costa, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/846,890

(22) Filed: Dec. 19, 2017

(65) Prior Publication Data
US 2018/0109347 A1    Apr. 19, 2018

Related U.S. Application Data

(63) Continuation of application No. PCT/EP2015/064085, filed on Jun. 23, 2015.

(51) Int. Cl.
H04J 13/18     (2011.01)
H04J 13/00     (2011.01)
H04J 13/10     (2011.01)

(52) U.S. Cl.
CPC .......... H04J 13/18 (2013.01); H04J 13/004 (2013.01); H04J 13/0025 (2013.01); H04J 13/102 (2013.01); H04B 2201/70714 (2013.01)

(58) Field of Classification Search
CPC ... H04W 16/14; H04W 72/082; H04W 88/08; H04W 16/10; H04W 84/18; H04W 4/08;
(Continued)

(56) References Cited

U.S. PATENT DOCUMENTS 6,804,217 B1    10/2004  Miyatani et al.
2002/0097781 A1*  7/2002  Bejjani .................. H04B 1/707
                                                       375/146
(Continued)

FOREIGN PATENT DOCUMENTS

CN    1795632 A    6/2006
CN    102165421 A    8/2011
(Continued)

OTHER PUBLICATIONS

Fred Tzeng et al.,"A Universal Code-Modulated Path-Sharing Multi-Antenna Receiver",This full text paper was peer reviewed at the direction of IEEE Communications Society subject matter experts for publication in the WCNC 2008 proceedings.,total 6 pages.
(Continued)

Primary Examiner — Vineeta S Panwalkar
(74) Attorney, Agent, or Firm — Fish & Richardson P.C.

(57) ABSTRACT

The present invention relates to a controller, an access node, an aggregation node and methods thereof in a radio communication network. The controller comprises: a processor configured to select a plurality of spreading codes that are non-orthogonal or short orthogonal, and a transmitter coupled with the processor. The transmitter is configured to notify at least one of an access node or an aggregation node of the plurality of spreading codes.

4 Claims, 10 Drawing Sheets

(58) Field of Classification Search
CPC . H04W 72/046; H04W 72/1226; H04J 13/18; H04J 13/102; H04J 13/004; H04J 13/0025; H04B 2201/70714
See application file for complete search history.

(56) References Cited

U.S. PATENT DOCUMENTS

| | | | |
|---|---|---|---|
| 2006/0198293 A1* | 9/2006 | Nishio | H04L 1/0026 370/208 |
| 2007/0053280 A1 | 3/2007 | Uesugi | |
| 2009/0082027 A1* | 3/2009 | Yavuz | H04W 52/244 455/446 |
| 2010/0074119 A1 | 3/2010 | Krishnaswamy | |
| 2014/0162675 A1* | 6/2014 | Rost | H04W 28/20 455/452.1 |
| 2014/0211615 A1 | 7/2014 | Murphy et al. | |

FOREIGN PATENT DOCUMENTS

| | | |
|---|---|---|
| CN | 103227819 A | 7/2013 |
| CN | 103873378 A | 6/2014 |
| WO | 0163779 A2 | 8/2001 |
| WO | 03017558 A2 | 2/2003 |
| WO | 03085859 A1 | 10/2003 |
| WO | 2009149107 A1 | 12/2009 |

OTHER PUBLICATIONS

Mugen Peng et al.,"Fronthaul-Constrained Cloud Radio Access Networks: Insights and Challenges",IEEE Wireless Communications • Apr. 2015,total 9 pages.

Elias A. Alwan et al.,"Low Cost, Power Efficient, On-Site Coding Receiver (OSCR) for Ultra-Wideband Digital Beamforming",2013 IEEE,total 5 pages.

Elias A. Alwan et al.,"Ultra-Wideband On-Site Coding Receiver (OSCR) for Digital Beamforming Applications",2013 IEEE,total 2 pages.

International Search Report issued in International Application No. PCT/EP2015/064085 dated Feb. 10, 2016, 15 pages.

Chinese Office Action issued in Chinese Application No. 201580080783.1 dated Oct. 16, 2018, 12 pages.

* cited by examiner

CONTROLLER, ACCESS NODE AND AGGREGATION NODE IN A RADIO COMMUNICATION NETWORK

CROSS-REFERENCE TO RELATED APPLICATIONS

This application is a continuation of International Application No. PCT/EP2015/064085, filed on Jun. 23, 2015, the disclosure of which is hereby incorporated by reference in its entirety.

TECHNICAL FIELD

The present invention relates to a controller, an access node and an aggregation node in a radio communication network. The present invention also relates to a radio communication network and to methods for a radio communication network.

BACKGROUND

In the context of next generation wireless networks, with a targeted commercialization time around the year 2020, millimeter wave radio is considered to be used for the purpose of establishing two types of backhaul nodes, aggregation and non-aggregation backhaul nodes. A non-aggregation backhaul node is usually associated with an access node (or access point, or base station, or Node B or eNode B/eNB) and hereafter referred as access node. The access nodes can be installed on building walls or lamp posts while the aggregation nodes can be installed on a building top. The aggregation node is used to aggregate signals from multiple access nodes. The aggregated signals can then be transported further to other network nodes for processing. Millimeter wave is the radio wave with wavelength between 1 mm and 10 mm, corresponding to frequencies from 30 GHz to 300 GHz. Due to the large chunk of available spectrum bands, millimeter wave is preferable for carrying high bit rate data on the backhaul link.

Generally, backhaul links can be implemented either as transmitting/receiving decoded information data or as transmitting/receiving quantized RF signals. For the latter case, the baseband part (BBU, baseband unit) of signal processing is normally done in a processor pool (the Cloud, and normally co-located with Core Network functionalities), and the access node (ANd) is a simple radio front RRH (remote radio head) including e.g. power amplifier, antenna and simple controlling circuitry. In such a deployment, the link between aggregation node and access node is usually called fronthaul link. The corresponding access node and aggregation node can be called fronthaul node and aggregation fronthaul node, respectively.

As the access node and the user terminal will work on spectrum, e.g. 3.5 GHz, which is lower than the millimeter wave spectrum, conversion of signal between the lower spectrum and millimeter wave spectrum is needed. One implementation of fronthaul (analog fronthauling) is, for uplink, to convert the signal from the access node directly to the millimeter wave band, using a mixer type of device, and transmit the signal on the fronthaul link to the aggregation node. At the aggregation node, the signal will be down-converted, again using a mixer type of device, sampled and then sent to the Cloud. For downlink, the quantized RF signal, which is generated within the Cloud, will be first up-converted and transmitted on the millimeter wave link to the access node. Before up-conversion, the quantized signal needs to go through a Digital-to-Analog Converter (DAC). At the access node, the signal will be down-converted and sent to the user node.

In the above implementation of analog fronthauling, the signals from each antenna branch of the access node with e.g. 200 MHz bandwidth is transmitted on a separate 200 MHz channel on the millimeter wave link, and afterwards the access signal on that 200 MHz channel is digitized with a separated Analog-to-Digital Converter, ADC (one ADC for one 200 MHz channel) at the receiving end. Since the ADC is normally the most expensive and power hungry component in the radio frontend circuitry, it will be beneficial to reduce the number of ADC needed in the design.

A possible solution to save cost of ADCs is to use Coded Multiplexing scheme in the fronthaul node and the aggregation fronthaul node.

For the uplink, using spreading with orthogonal codes, the multiple streams from the different antenna channel can be multiplexed onto a same composite stream in the time-frequency domain. At the receiver side, the composite stream will be sampled by a high speed ADC. In such way, multiple ADCs are avoided hence the cost and energy consumption can be lowered. The disadvantages of such a design are the added complexity of spreading/despreading and high-speed ADC is needed to sample the after-spreading signal as the signal bandwidth is increased by the spreading.

Alwan, E. A.; Khalil, W.; Volakis, J. L., "Ultra-wideband on-site coding receiver (OSCR) for digital beamforming applications", IEEE Antennas and Propagation Society International Symposium (APSURSI), 2013 disclosed a one coded multiplexing solution using orthogonal codes to reduce hardware and power cost in a digital beamforming architecture. The bandwidth needed for the coded multiplexing is similar to that of the frequency division multiplexing solution, i.e. to place the signal from different antenna in subsequent frequency channels. In other words, there are no capacity savings.

SUMMARY OF THE INVENTION

The objective of the present invention is to provide elements in a radio communication network, wherein the one or more of the above-mentioned problems of the prior art are overcome.

A first aspect of the invention provides a controller in a radio communication network, the controller comprising:
- a processor configured to select a plurality of spreading codes which are non-orthogonal or short orthogonal, and
- a transmitter configured to notify at least one of an access node and an aggregation node of the plurality of spreading codes.

According to the first aspect, the controller is independent from the access node and the aggregation node. The transmitter of the controller can be a radio transmitter or a wired transmitter. The radio transmitter can notify the access node and/or aggregation node through by transmitting the spreading codes over a wireless link. In case of a wired transmitter, the transmitter can be connected to the access node and/or the aggregation node through a cable, e.g. a data network connection. The controller can notify the access node and/or aggregation node e.g. by transmitting one or more identifiers of the spreading codes and/or by directly transmitting the spreading codes themselves.

Preferably, the used non-orthogonal spreading codes have a low correlation, i.e., the resulting correlation matrix is non-diagonal, but the off-diagonal entries can be minimized. For example, m-sequence codes can be used as non-orthogonal spreading codes.

Short orthogonal codes are codes that are orthogonal when used for spreading m signals, but are here used for spreading n signals, where n>m, for example the family of Walsh-Hadamard codes.

Instead of using usual orthogonal spreading codes, the controller of the first aspect is configured to notify at least one of an access node and an aggregation node of non-orthogonal or short orthogonal codes. These can be low correlation codes in a coded multiplexing architecture. The spreading factor can be less than the number of multiple streams in such an architecture. The advantages can include a smaller bandwidth on the fronthaul link, which can lead to lower requirement on the beamforming capability of an aggregation fronthaul node. Thus, more flexibility of resource management on the fronthaul link can be achieved. The resource allocation can be done on spatial dimension as well as spectral dimension among multiple access nodes which are communicating with the same aggregation node.

Based on the spreading codes notified by the controller, non-orthogonal or short orthogonal spreading codes can be used in coded multiplexing of multiple signal streams from different antennas of one access node. Based on the spreading codes and signal mixing spectral multiplexing among multiple access nodes can be achieved.

By using non-orthogonal spreading codes, the bandwidth used by the link between one access node and the aggregation node can be decreased. Consequently, the spectral multiplexing of links between multiple access nodes and the aggregation fronthaul node can be made more efficiently. The non-orthogonal spreading codes can be dynamically re-configured by the controller, based e.g. on the measured fronthaul link SNR.

The inventors realized that a problem with orthogonal codes is that the number of different orthogonal codes is limited. For example, for code length N, there will be at most N orthogonal codes available. If a number of backhaul links for one aggregation backhaul node is larger than N, some of the links become undistinguishable only by code multiplexing. In this case, we need to use spectral dimension to separate them. When spectral bandwidth is limited, smaller bandwidth by each backhaul link is appreciated. This can be achieved by using the non-orthogonal or short orthogonal spreading codes as notified by the controller.

In another deployment scenario where one access node acts as a relay node for another access node, it is beneficial that the reception and the retransmission of the signal from another access node use different portions of the system bandwidth, i.e. the signal of fronthaul node use part of the system bandwidth, and not the whole system bandwidth available. This can be achieved with the use of non-orthogonal or short orthogonal codes according to the first aspect.

Another embodiment of the disclosed method is, in case that the backhaul link is not constrained by available bandwidth resource, different spreading codes can be used to equalize SNR from different access nodes such that the quality of their links with the aggregation node are at a similar level.

When the controller notifies an access node, the plurality of spreading codes can be used for spreading a plurality of received signals that the access node has received using a plurality of receive antennas.

When the controller notifies an aggregation node, the plurality of spreading codes can be used for despreading a spread plurality of signals.

In a first implementation of the controller according to the first aspect, the processor is configured to select the plurality of spreading codes based on a channel quality between the access node and the aggregation node.

In particular, the channel quality can comprise a path loss, a signal-to-noise ratio and/or a signal-to-interference-plus-noise-ratio. In other embodiments, the channel quality can also comprise structured data about the channel quality.

The first implementation has the advantage that the spreading codes can be adapted based on a channel quality. The channel quality can be a measured channel quality, e.g. measured by the aggregation node and/or the access node.

In a second implementation of the controller according to the first aspect, the transmitter is further configured to request a measurement of the channel quality.

This has the advantage that the controller can request a measurement of the channel quality when required. In particular, the controller can request a measurement from at least one of the aggregation node, the access node or the cloud. For example, the controller can be configured to request a measurement in regular time intervals or can be triggered by an event that is determined in the network, e.g. at the controller, the aggregation node and/or the access node. For example, the measurement can be triggered when the controller determines that there is a need for spectral multiplexing among different access nodes.

In a third implementation of the controller according to the first aspect, the processor is configured to select the plurality of spreading codes based on the channel quality by: using a channel quality search look-up-table for the plurality of spreading codes, wherein the look-up-table comprises a mapping from a range of channel quality values to a plurality of spreading codes, wherein the controller further comprises a receiver configured to receive a measured channel quality value.

The channel quality search look-up table for the plurality of spreading codes provides an efficient and reproducible way of assigning spreading codes based on a measured channel quality value. The channel quality search look-up table can be based on simple threshold comparisons.

As illustrated in the following, based on different ranges of signal-to-noise ratios different sets of spreading codes can be assigned:

| SNR Range [dB] | Spreading codes |
| --- | --- |
| 10 . . . 20 | m-sequence code of length 7 |
| 20 . . . 25 | Walsh-Hadamard code of length 16 |

Note that preferably, the assigned spreading codes all have the same spreading factor.

A second aspect of the invention relates to an access node in a radio communication network, comprising:
  at least one first receive antenna configured to receive a plurality of physical signals from one or more user nodes,
  a processor configured to spread the plurality of physical signals with a plurality of spreading codes and compose the plurality of spread signals to generate a first composite signal, and
  at least one first transmit antenna configured to transmit the first composite signal to an aggregation node,
wherein the plurality of spreading codes are non-orthogonal or short orthogonal.

In a first implementation of the access node of the first aspect, the processor is further configured to select the plurality of spreading codes. In this way, the controller is located in the access node. This has the advantage that the access node comprises also the functionality of the controller. Thus, an amount of signaling between different nodes can be reduced.

Alternatively, the access node can comprise a receiver configured to receive the plurality of spreading codes from a controller. In this way, the controller is separate from the access node. For example, the controller can be located in the cloud. Thus, one controller can be configured to notify a plurality of access node of the plurality of spreading codes. The controller can be configured to notify different access nodes of different spreading codes.

In a second implementation of the access node of the second aspect, the access node further comprises:
 at least one second receive antenna configured to receive a second composite signal from the aggregation node, wherein the processor is further configured to despread and decompose the second composite signal using the plurality of spreading codes to obtain a plurality of despread signals;
 a multi-user detector configured to obtain a plurality of estimated signals from the plurality of despread signals; and
 a plurality of second transmit antennas configured to transmit the plurality of estimated signals to the user nodes.

This implementation has the advantage that the plurality of spreading codes can be used both for communication that is received by the access node and for communication that is transmitted from the access node.

A third aspect of the invention relates to an aggregation node in a radio communication network, comprising:
 a receive antenna configured to receive a first composite signal from an access node, and
 a processor configured to despread and decompose the first composite signal using a plurality of spreading codes to obtain a plurality of despread signals,
wherein the plurality of spreading codes are non-orthogonal or short orthogonal.

According to the third aspect the processor is further configured to select the plurality of spreading codes. This has the advantage that the aggregation node comprises also the functionality of the controller. Thus, an amount of signaling between different nodes can be reduced. In particular, the aggregation node can be configured to notify a plurality of access nodes of the spreading codes.

Alternatively, the aggregation node further comprises a receiver configured to receive the plurality of spreading codes from a controller. In this way, the controller is separate from the aggregation node. For example, the controller can be located in the cloud. Thus, one controller can be configured to notify a plurality of aggregation nodes of the plurality of spreading codes. The controller can be configured to notify different aggregation nodes of different spreading codes.

In a second implementation of the aggregation node of the third aspect, the processor is configured to use a multi-user detection scheme to obtain a plurality of estimated signals from the plurality of despread signals.

Contamination between the different signals associated with different receive antennas can be reduced by using low-correlation codes. Furthermore, a multi-user detection scheme can be used in order to obtain estimated signals, in particular estimated antenna signals, from the despread signals.

In a third implementation of the aggregation node of the third aspect, the processor is further configured to spread a plurality of baseband signals with the plurality of spreading codes and compose the plurality of spread signals to generate a second composite signal, wherein the aggregation node further comprises transmit antenna configured to transmit the second composite signal to the access node. The baseband signals can be received e.g. from the core network.

This implementation has the advantage that the plurality of spreading codes can be used both for communication that is received by the aggregation node and for communication that is transmitted from the aggregation node.

A fourth aspect of the invention relates to a radio communication network comprising at least one of the controller according to the first aspect, the access node according to the second aspect, and the aggregation node according to the third aspect.

The controller can be located in the cloud and can be configured to notify a plurality of access nodes and/or a plurality of aggregation node of the spreading codes.

A fifth aspect of the invention relates to a method for a radio communication network, comprising:
 selecting a plurality of spreading codes which are non-orthogonal or short orthogonal, and
 notifying at least one of an access node and an aggregation node of the plurality of spreading codes.

The method of the fifth aspect can be carried out by a controller in a radio communication network, for example the method can be carried out by the controller of the first aspect or one of the implementations of the first aspect. However, the method can also be carried out by other entities in the radio communication network.

A sixth aspect of the invention relates to a method for a radio communication network, comprising:
 receiving a plurality of signals from one or more user nodes using a plurality of receive antennas,
 spreading the plurality of signals with a plurality of spreading codes,
 composing the plurality of spread signals to generate a composite signal, and
 transmitting the composite signal to an aggregation node,
wherein the plurality of spreading codes are non-orthogonal or short orthogonal.

The method of the sixth aspect can be carried out by an access node in a radio communication network, for example the method can be carried out by the access node of the second aspect or one of the implementations of the second aspect. However, the method can also be carried out by other entities in the radio communication network.

A seventh aspect of the invention relates to a method for a radio communication network, comprising:
 receiving a composite signal from an access node, and
 despreading and decomposing the composite signal using a plurality of spreading codes to obtain a plurality of despread signals,
wherein the plurality of spreading codes are non-orthogonal or short orthogonal.

The method of the seventh aspect can be carried out by an aggregation node, for example the method can be carried out by the aggregation node of the third aspect or one of the implementations of the third aspect. However, the method can also be carried out by other entities in the radio communication network.

An eighth aspect of the invention relates to an access node in a radio communication network, comprising:
 at least one receive antenna configured to receive a composite signal, a processor configured to despread and decompose the composite signal using a plurality of spreading codes to obtain a plurality of despread signals, and a plurality of transmit antennas configured to transmit the plurality of despread signals to one or more user nodes, wherein the plurality of spreading codes are non-orthogonal or short orthogonal.

A ninth aspect of the invention relates to an aggregation node in a radio communication network, comprising:

a processor configured to spread a plurality of signals with a plurality of spreading codes and compose the plurality of spread signals to generate a composite signal; and a transmit antenna for transmitting the composite signal, wherein the plurality of spreading codes are non-orthogonal or short orthogonal.

A further aspect of the invention relates to a computer-readable storage medium storing program code, the program code comprising instructions for carrying out the method of the fifth, sixth or seventh aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, but modifications on these embodiments are possible without departing from the scope of the present invention as defined in the claims.

DETAILED DESCRIPTION OF THE EMBODIMENTS

Figure 1:
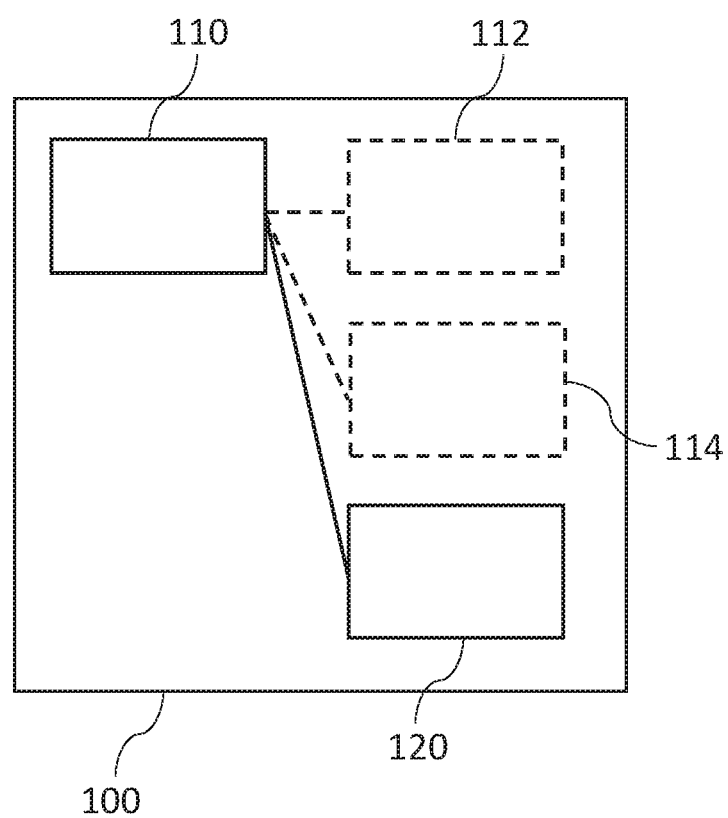
FIG. 1 is a block diagram illustrating a controller in accordance with an embodiment of the present invention.

FIG. 1 is a block diagram illustrating a controller 100 in accordance with an embodiment of the present invention. The controller 100 comprises a processor 110 and a transmitter 120. The processor 110 is configured to select a plurality of spreading codes which are non-orthogonal or short orthogonal. In a possible embodiment the processor 110 is configured to use a look-up table 114, indicated with dashed lines in FIG. 1, to select the plurality of spreading codes. FIG. 1 shows that the look-up table is part of the controller 100, however, in other embodiments the look-up table could also be external to the controller, e.g. in the cloud.

In a possible embodiment the controller 100 further comprises a receiver 112, indicated with dashed lines in FIG. 1, for receiving a channel quality value. For example, the channel quality value could be measured by an access node and/or aggregation node and be transmitted to the receiver 112 of the controller 100.

Figure 2A:
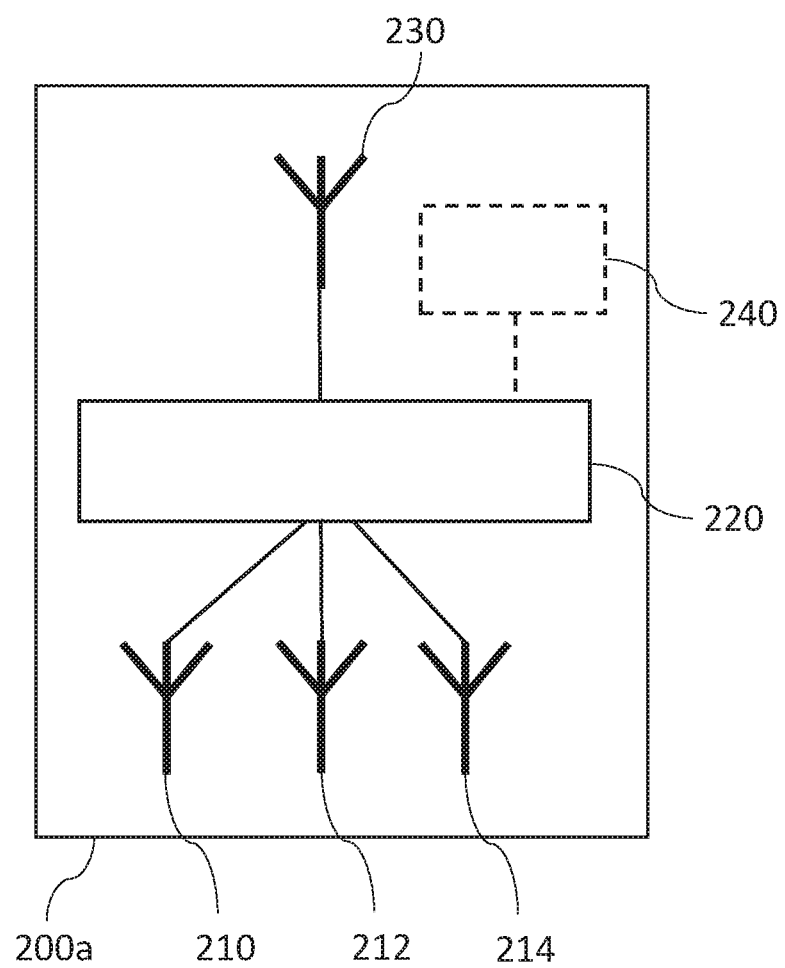
FIG. 2a is a block diagram illustrating an access node in accordance with an embodiment of the present invention.

FIG. 2a is a block diagram illustrating an access node 200a in accordance with an embodiment of the present invention. The access node 200a comprises a plurality of first receive antennas 210, 212, 214. FIG. 2a shows three first receive antennas 210, 212, 214, but it is understood that in other embodiments of the invention, the access node 200a could comprise a different number of first receive antennas. The first receive antennas 210, 212, 214 are configured to receive a plurality of physical signals from one or more user nodes (not shown in FIG. 2a). The access node 200a further comprises a processor 220 which is configured to spread the plurality of physical signals with a plurality of spreading codes and compose the plurality of spread signals to generate a first composite signal.

The access node 200a further comprises at least one first transmission antenna 230 configured to transmit the first composite signal to an aggregation node.

In a possible embodiment, the access node 200a further comprises a receiver 240, shown with dashed lines in FIG. 2a, configured to receive the plurality of spreading codes from a controller. In other embodiments, the access node 200a does not comprise such a receiver, but the processor 220 is configured to select the plurality of spreading codes.

Figure 2B:
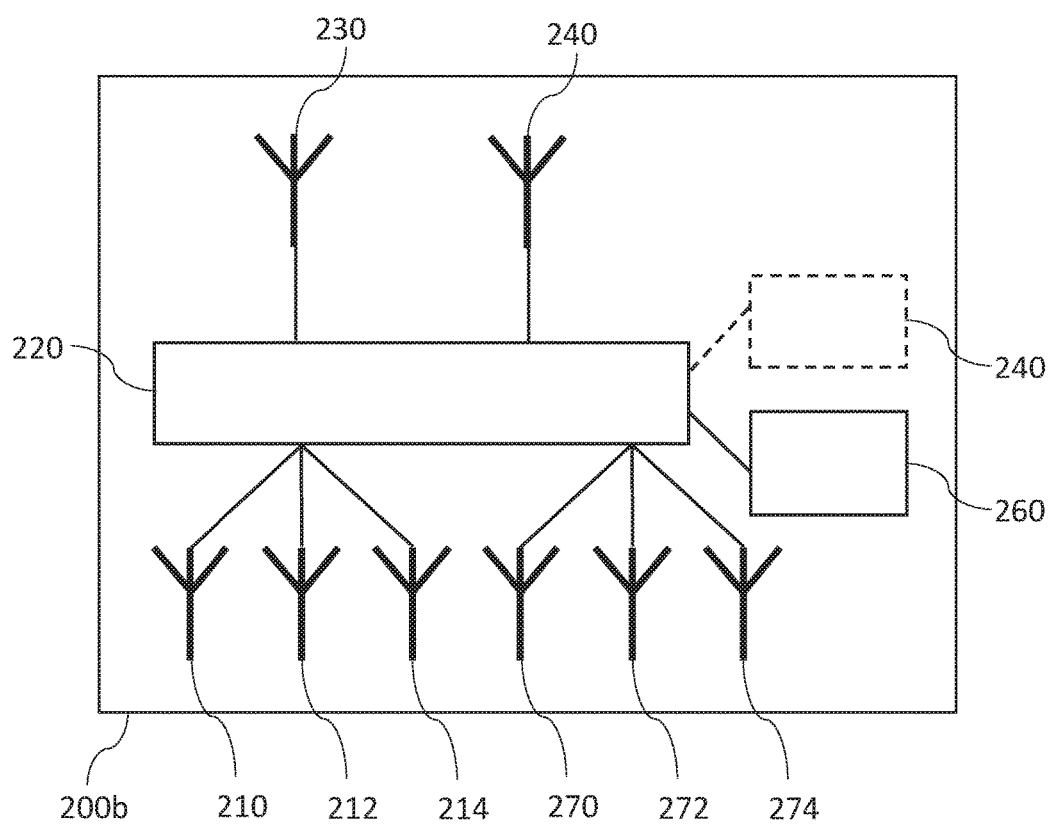
FIG. 2b is a block diagram illustrating a further access node in accordance with an embodiment of the present invention.

FIG. 2b is a block diagram illustrating a further access node 200b in accordance with a further embodiment of the present invention. Compared to the access node 200a shown in FIG. 2a, the access node 200b of FIG. 2b further comprises a plurality of second receive antennas 270, 272, 274 and a second transmit antenna 240. The second receive antenna 240 is configured to receive a second composite signal from the aggregation node. The processor 220 is configured to despread and decompose the second composite signal using the plurality of spreading codes to obtain a plurality of despread signals.

In a possible embodiment of the invention, the same physical antenna acts as first transmit antenna 230 and second receive antenna 240 and/or the same plurality of physical antennas act as first receive antennas 210, 212, 214 and second transmit antennas 270, 272, 274.

The access node 200b further comprises a multi-user detector 260 configured to obtain a plurality of estimated signals from the plurality of despread signals. The plurality of second transmit antennas 270, 272, 274 is configured to transmit the plurality of estimated signals to the user nodes.

FIG. 2b shows that the multi-user detector 260 is separate from the processor 220, however, in other embodiments, the processor 260 can be configured to implement a multi-user detection scheme, so that no multi-user detector 260 external to the processor 220 is required.

In another embodiment of the invention, the access node 200b comprises a receiver 240, indicated with dashed lines in FIG. 2b. The receiver 240 can be configured to receive the plurality of spreading codes from a controller.

Figure 3:
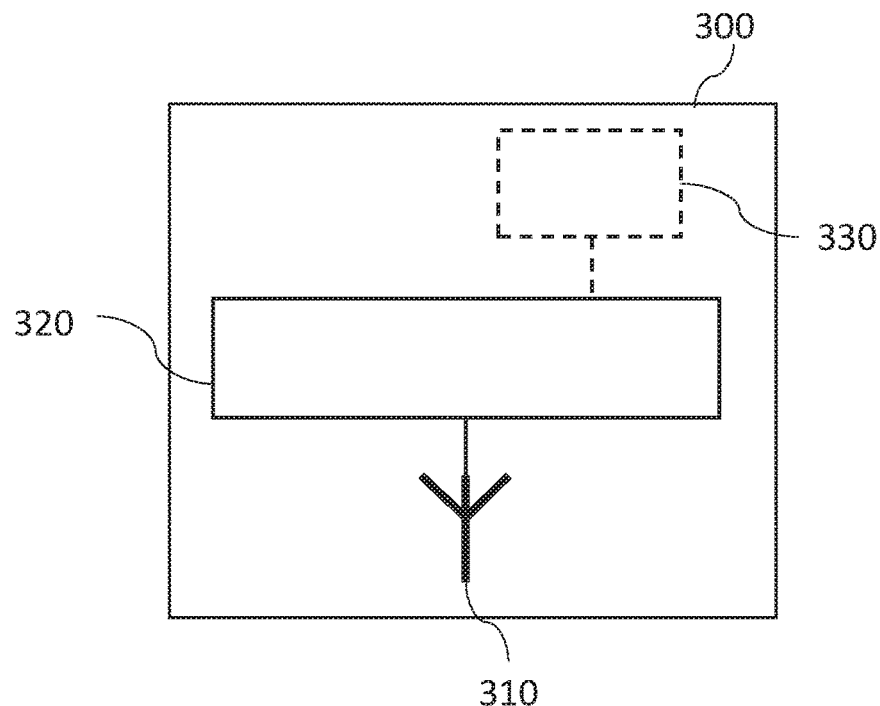
FIG. 3 is a block diagram illustrating an aggregation node in accordance with an embodiment of the present invention.

FIG. 3 is a block diagram illustrating an aggregation node 300 in accordance with an embodiment of the present invention. The aggregation node 300 comprises a receive antenna 310 and a processor 320.

Optionally, the aggregation node 300 also comprises a receiver 330, indicated with dashed lines in FIG. 3, wherein the receiver 330 is configured to receive the plurality of spreading codes from a controller.

Figure 4:
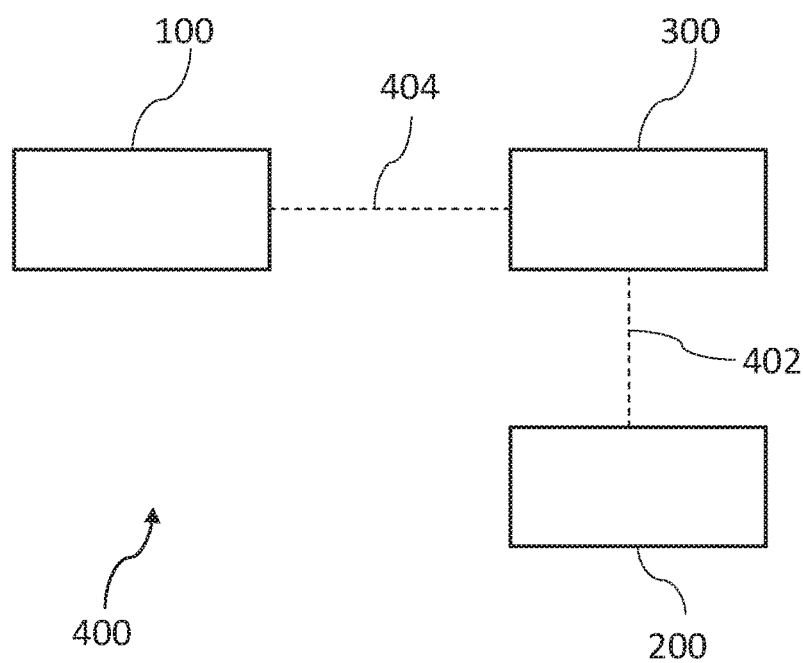
FIG. 4 is a block diagram illustrating a radio communication network in accordance with an embodiment of the present invention.

FIG. 4 is a block diagram illustrating a radio communication network 400 in accordance with an embodiment of the present invention. The radio communication network 400 comprises a controller 100, an aggregation node 300, and an access node 200.

Within one communication network, the information is transferred from information source node to the information reception node. Very often the transferring is achieved wirelessly through one or multiple radio communication links. The radio links have different properties due to the different frequency bands used. Preferably, the millimeter wave band is used for the link between the access node 200 and the aggregation node 300.

Preferably, the radio communication network 400 is configured to establish a radio communication link 402, indicated in FIG. 4 as a dashed line, between the access node 200 and the aggregation node 300, wherein a quality of the radio communication link 402 can be measured e.g. at the aggregation node 300 and/or the access node 200.

Optionally, the controller 100 is connected to the aggregation node 300 through a wired link 404, indicated in FIG. 4 as a dashed line. In other embodiments of the invention, the controller can be configured to notify the aggregation node of the plurality of spreading codes through a radio link (not shown in FIG. 4).

Figure 5:
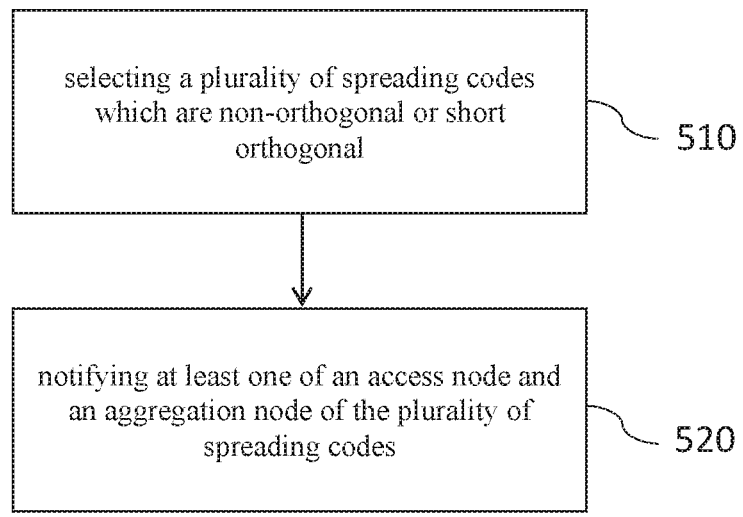
FIG. 5 is a flow chart of a method for a radio communication network in accordance with an embodiment of the present invention, wherein the method is preferably implemented in a controller.

FIG. 5 is a flow chart of a method for a radio communication network in accordance with an embodiment of the present invention, wherein the method is preferably implemented in a controller of the radio communication network.

The method comprises a first step 510 of selecting a plurality of spreading codes which are non-orthogonal or short orthogonal.

In a second step 520, at least one of an access node and an aggregation node is notified of the plurality of spreading codes.

The method of FIG. 5 can preferably be implemented in a controller of a radio communication network. However, the method of FIG. 5 can also be implemented in other entities, e.g. in other nodes of a radio communication network. Current communication networks often comprise multiple nodes of different types. The terminology "node" includes, but is not limited to a user terminal device, a base station, a relay station, or any other type of device capable of operating in a wireless or wire-line environment. When referred to herein, the terminology "node" includes but is not limited to a base station, a Node-B or eNode-B, an access node, a base station controller, an aggregation point or any other type of interfacing device in a communication environment.

Figure 6:
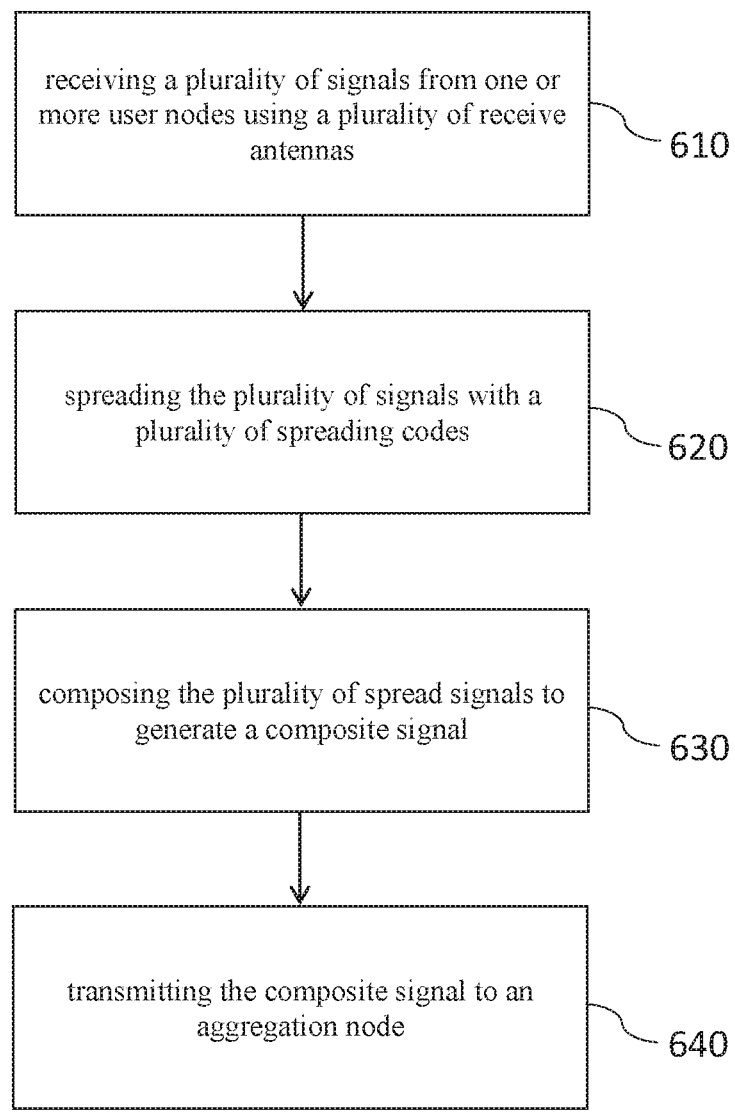
FIG. 6 is a flow chart of a method for a radio communication network in accordance with an embodiment of the present invention, wherein the method is preferably implemented in an access node.

FIG. 6 is a flow chart of a method for a radio communication network in accordance with an embodiment of the present invention. The method comprises a first step 610 of receiving a plurality of signals from one or more user nodes using a plurality of receive antennas. In a second step 620, the plurality of signals is spread with a plurality of spreading codes. In a third step 630, the plurality of spread signals are composed to generate a composite signal. In a fourth step 640, the composite signal is transmitted to an aggregation node.

The method of FIG. 6 can preferably be implemented in an access node of a radio communication network. However, the method of FIG. 6 can also be implemented in other entities, e.g. in other nodes of the radio communication network.

Figure 7:
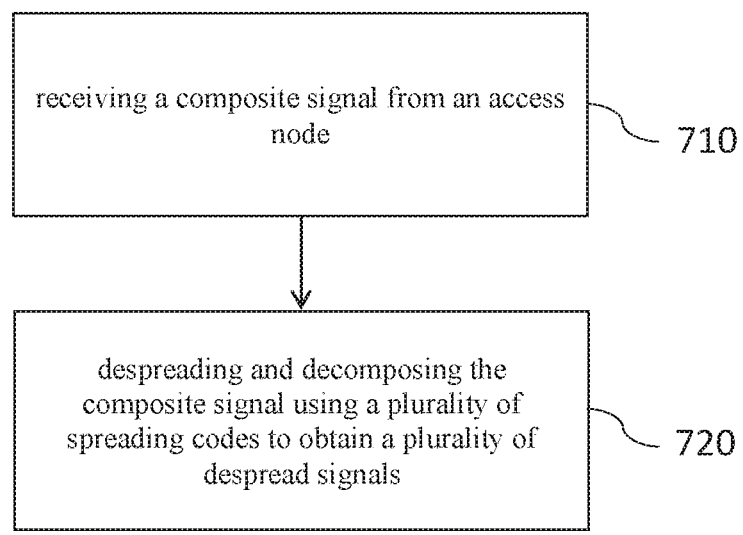
FIG. 7 is a flow chart of a method for a radio communication network in accordance with an embodiment of the present invention, wherein the method is preferably implemented in an aggregation node.

FIG. 7 is a flow chart of a method for a radio communication network in accordance with an embodiment of the present invention. The method comprises a first step 710 of receiving a composite signal from an access node. In a second step 720, the composite signal is despread and decomposed using a plurality of spreading codes to obtain a plurality of despread signals.

The method of FIG. 7 can preferably be implemented in an aggregation node of a radio communication network. However, the method of FIG. 7 can also be implemented in other entities, e.g. in other nodes of the radio communication network.

Figure 8:
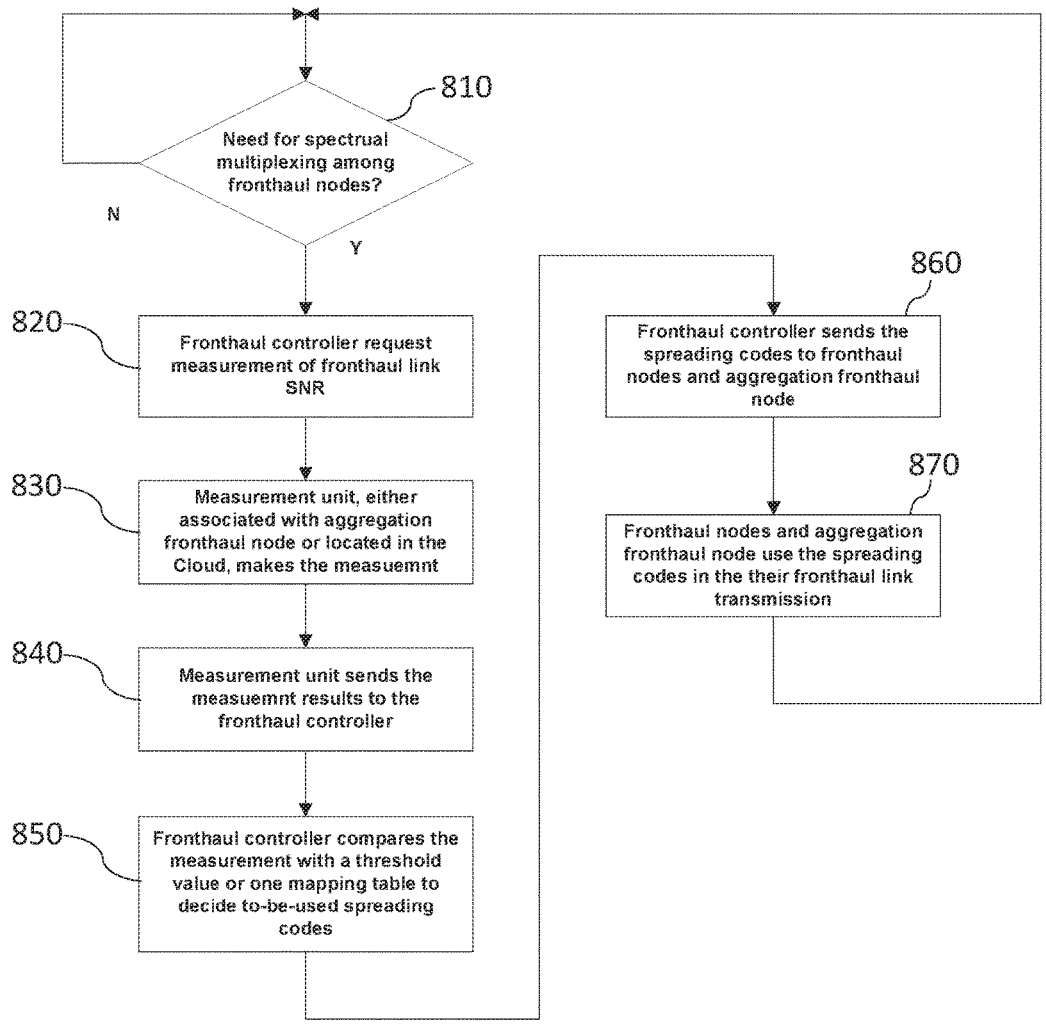
FIG. 8 is a flow chart of a method for a radio communication network in accordance with an embodiment of the present invention.

FIG. 8 is a flow chart of a further method in accordance with an embodiment of the present invention. The method is implemented for communication between fronthaul nodes, which act as access nodes, and aggregation fronthaul nodes, which act as aggregation nodes.

In a first step 810, it is determined whether there is a need for spectral multiplexing among fronthaul nodes. If there is a need, the method continues in step 820, where a fronthaul controller requests a measurement of a signal-to-noise ratio of a fronthaul link.

In step 830, a measurement unit, associated with the aggregation fronthaul node or located in the cloud, makes the measurement. In response to this request, in step 840, the measurement unit sends the measurement results to the fronthaul controller.

In step 850, the fronthaul controller compares the measurement with a threshold value or a mapping table to select the to-be-used spreading codes.

In step 860, the fronthaul controller sends the selected spreading codes to one or more fronthaul nodes and the aggregation node fronthaul node. In step 870, the fronthaul nodes and the aggregation fronthaul nodes use the sent spreading codes in their fronthaul link transmission.

Figure 9:
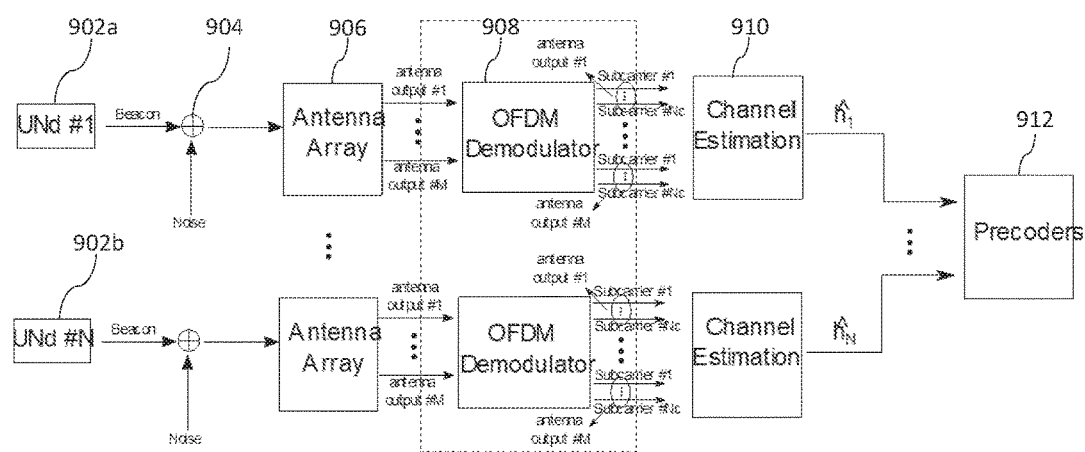
FIG. 9 is a schematic illustration of a system for calculating precoders using upload beacons from N user nodes.

FIG. 9 is a schematic of the basic approach for calculating precoders using upload beacons from N user nodes. FIG. 9 shows the processing steps for a first user node 902a, and an n-th user node 902b.

The user nodes 902a, 902b send a beacon signal, which is polluted with additive noise (indicated with reference number 904) and then received at an antenna array 906, which comprises M antennas, thus yielding M antenna outputs which are processed at an OFDM demodulator 908 to yield $N_c$ subcarrier signals for each of the M antennas. Subsequently, a channel estimator 910 obtains channel estimates $\hat{h}_1$ to $\hat{h}_N$. The precoders are obtained from a Zero-Forcing (ZF) solution using the channel estimates. The channel estimates $\hat{h}_m(f_n) \in \mathbb{C}^{N \times 1}$ can be obtained using the method illustrated in FIG. 10.

The antenna outputs can be processed on a central node (such as in CRAN) via a fronthaul connection or the precoder calculation can be done at remote radio units.

Figure 10:
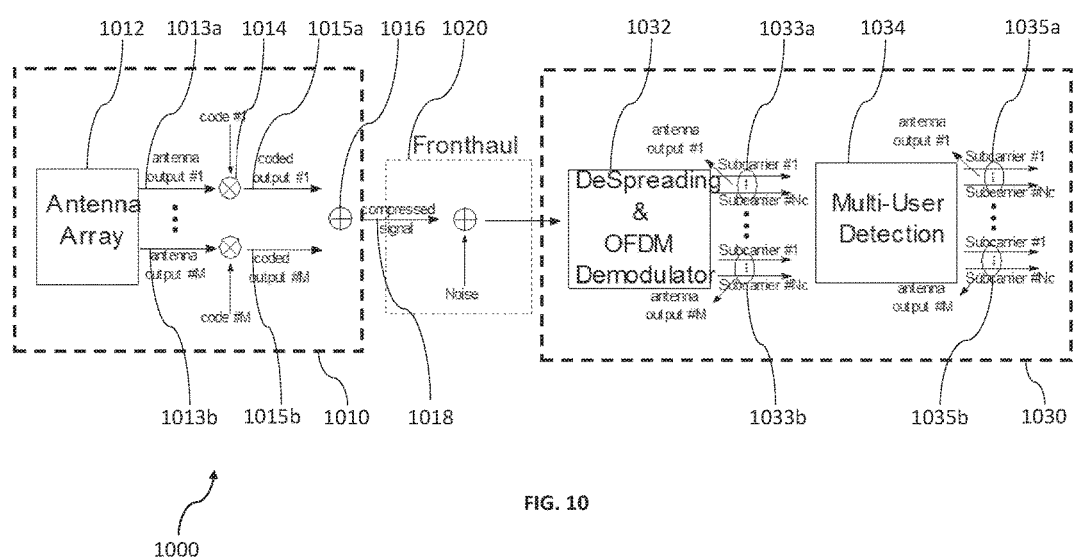
FIG. 10 is a schematic illustration of a system comprising an access node and aggregation node in accordance with embodiments of the present invention.

FIG. 10 is a block diagram of a system 1000 comprising an access node 1010 and an aggregation node 1030 that are connected via a fronthaul radio link 1020.

The access node 1010 comprises an antenna array 1012 with M antennas. The antenna array outputs M antenna output signals, including a first antenna output signal 1013a up to an M-th antenna output signal 1013b. The M antenna output signals are encoded using a spreading unit 1014, which employs M spreading codes. Thus, M coded output signals are obtained, including a first coded output signal 1015a up to an M-th coded output signal 1015b. The coded output signals 1015a, 1015 are summed by a summing unit 1016 to obtain a compressed signal 1018, which is composite signal. The compressed signal 1018 is transmitted over the fronthaul radio link 1020 to the aggregation node 1030.

The aggregation node 1030 comprises a Despreading and OFDM Demodulator unit 1032, which can be implemented by a processor (not shown in FIG. 10) configured to despread and demodulate the received compressed signal. The Despreading and OFDM Demodulator unit 1032 yields M despread signals, corresponding to the M output signals. Since non-orthogonal or short spreading codes were used, each of the M despread signals can comprise interference from the other signals.

Each of the M despread signals 1033a, 1033b comprises Nc subcarrier signals, which can also be affected by the interference.

A multi-user detection unit 1034 is used to remove interference and provide estimated antenna signals 1035a, 1035b.

The channel can be estimated once the symbols at each subcarrier and for all of the antennas are obtained. This last part can be identical to the procedure illustrated in FIG. 9.

Next, the performance of the Zero-forcing beamformer is given in terms of array output SINR. The weight vectors are found from channel estimates obtained according to the scheme illustrated in FIG. 9 (no coding) and with the scheme illustrated in FIG. 10 (with coding).

In the following, we consider a multi-user single-input-multiple-output (MU-SIMO) scenario with M users and a receive antenna array composed of N elements. Each user transmits an OFDM symbol of duration $T_s$=3.2 μs. Each OFDM symbol is comprised of $N_c$=640 subcarriers with a subcarrier spacing of $F_s$=312.5 kHz. The overall bandwidth is thus 200 MHz. For channel estimation, the symbols modulating the subcarriers are taken from a Gold sequence of size 1280, and the modulation scheme is QPSK.

We consider an LOS Urban Micro-Cell environment where the distance between the Tx and Rx is at most 40 meters. The signal received at the antenna array at subcarrier $f_n$ is written as $$y(f_n) = H(f_n)x(f_n) + n(f_n),$$

where $f_n$=1 ... $N_c$. Moreover, the dimensions of the above quantities are $y(f_n) \in \mathbb{C}^{N \times 1}$ $H(f_n) \in \mathbb{C}^{N \times M}$, and $x(f_n) \in \mathbb{C}^{M \times 1}$. The channel of the mth user is given by the mth-column of matrix $H(f_n)$, and it is denoted by $h_m(f_n) \in \mathbb{C}^{N \times 1}$. Vector $n(f_n) \in \mathbb{C}^{N \times 1}$ denotes the Additive White Gaussian Noise (AWGN) and it is taken from $N(0, \sigma_n^2)$.

The array output SINR for the mth user is given by:

$$SINR_m = 1/N_c \sum_{f_n=1}^{N_c} \frac{|w(f_n)_m^H h_m(f_n)|^2}{w(f_n)_m^H R_{i+n} w(f_n)_m}$$

where $w(f_n)_m \in \mathbb{C}^{N \times 1}$ denotes the beamformer weights (precoders) to the mth-user and $R_{i+n} \in \mathbb{C}^{N \times 1}$ denotes the interference-plus-noise covariance matrix:

$$R_{i+n} = \sum_{\substack{j=1 \\ j \neq m}}^{M} h_j(f_n) h_j(f_n)^H + \sigma_n^2 I.$$

The precoders are obtained from a Zero-Forcing (ZF) solution using channel estimates. The channel estimate $\hat{h}_m(f_n) \in \mathbb{C}^{N \times 1}$ is obtained by least-squares estimation (LSE) using either $y(f_n)$, or the compression method proposed next.

The proposed solution makes use of multi-carrier direct-sequence spread-spectrum (MC-DSSS) techniques for multiple-access in wireless communications and multiuser detection.

Let $y_n(t)$ be the signal at the output of the nth antenna element and $c_n(t)$ the corresponding spreading sequence. The proposed solution consists in code-multiplexing the output of the antenna array with a low-rate code such that the code-multiplexed signal has a smaller bandwidth than transmitting $\{y_n(t)\}n=1^N$ in disjoint frequency bands. In particular, the code-multiplexed data is given as follows:

$$z(t) = \sum_{n=1}^{N} y_n(t) \otimes c_n(t).$$

The spreading sequence is given by $c_n(t) = \Sigma_{l=1}^{L} c_n^l p_{T_c}(t-lT_c)$, where $T_c$ denotes the chip-period. The chip-period is related to the OFDM symbol duration by $T_c = T_s/L$, where L denotes the code-length. Moreover, $\{c_n^l\}_{l=1}^{L}$ denote the chips of the antenna specific spreading sequence and $p_{T_c}(t)$ denotes the rectangular pulse of period $T_c$. This type of multiple access scheme is referred to as multi-carrier direct-sequence spread-spectrum technique.

Once z(t) is received, the modulating symbols are obtained by first de-spreading and taking a DFT, and then employing a multiuser detection technique. An example with a zero-forcing linear multiuser detection method is given as follows:

$$\tilde{s}_n(n_c) = z(t) \otimes c_n(t) e^{j2\pi f_{n_c} t}$$

$$\hat{s} = R_c^{-1} \tilde{s},$$

where $\tilde{s} = [\tilde{s}_1 \ldots \tilde{s}_N]^T \in \mathbb{C}^{NN_c \times 1}$, $\tilde{s}_n = [\tilde{s}_n(1) \ldots \tilde{s}_n(N_c)]^T$, and $\tilde{s} \in \mathbb{C}^{NN_c \times 1}$. Matrix $R_c \in \mathbb{C}^{NN_c \times NN_c}$ denotes the code correlation, and it is a scaled diagonal if $$c_n(t) e^{j2\pi f_{n_c} t}$$

is orthogonal among different codes and subcarriers. In order to minimize the bandwidth in the fronthaul we employ low-rate codes, leading to a code correlation and a non-diagonal matrix $R_c$. Decreasing the rate of the code leads to an increase of the condition number of the correlation matrix, and the multiuser detection problem becomes ill-conditioned.

It is important to note that the employed code-rate scales with the product between the number of antennas and the number of subcarriers. This is because the code-spreading operating introduces inter-carrier interference, and the code needs to ensure orthogonality among different subcarriers. For example, a system with 8 antennas and 640 subcarriers needs a code-length of 5120 (640*8) in order to have an orthogonality between all of the symbols, i.e. the correlation matrix is diagonal. With such a code-length there are no savings in bandwidth compared to using no spreading at all. In fact, using a code-length of size 5120 leads to a bandwidth of 1.8 GHz which is even larger than that of using no spreading (1.6 GHz). Such a result follows by noting that code-spreading a multi-carrier signal results in spreading each of the subcarriers. It then follows that the bandwidth of each subcarrier increases from 312.5 kHz to 1.6 GHz (312.kHz*5120). The overall bandwidth of the code-spread signal is 1.8 GHz since the bandwidth of the multicarrier signal is 200 MHz (1.6 GHz+200 MHz).

Figure 11:
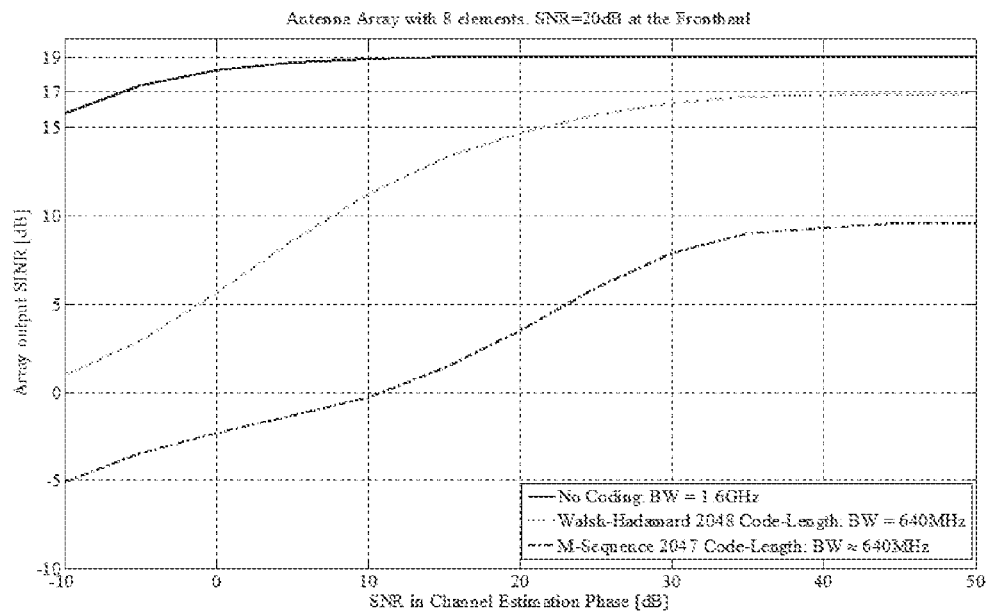
FIG. 11 is a diagram illustrating the performance of beamforming with the systems shown in FIGS. 9 and 10.

FIG. 11 is a diagram illustrating the performance of Zero-forcing beamforming, in terms of array output SINR, when the processing is done at the RRU or at the CRAN. When the processing is done at the CRAN, the array output signals are code-multiplexed using Walsh-Hadamard and M-Sequence codes. When there is no coding, the bandwidth requirement in the fronthaul is 1.6 GHz while using a code-multiplexed approach the bandwidth requirement is 640 MHz. Hence, the code-multiplexed approach provides a 60% gain in terms of bandwidth. In this numerical result we assume 8 users, and an antenna array of 8 elements.

Figure 12:
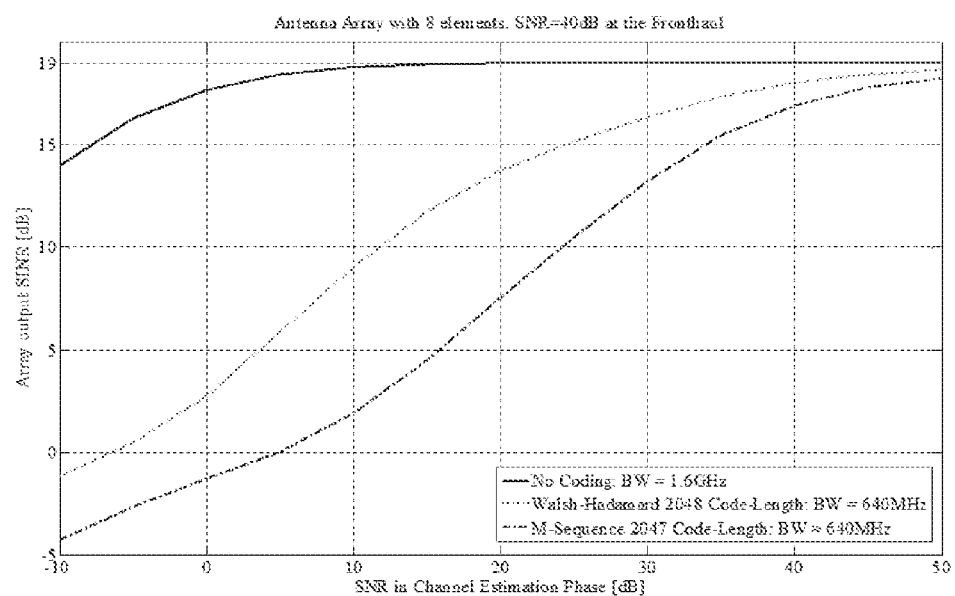
FIG. 12 is a further diagram illustrating the performance of beamforming with the systems shown in FIGS. 9 and 10.

FIG. 12 is a diagram illustrating the performance of the Zero-forcing beamforming in terms of array output SINR, when the processing is done at the RRU or at the CRAN. When the processing is done at the CRAN, the array output signals are code-multiplexed using Walsh-Hadamard and M-Sequence codes. When there is no coding, the bandwidth requirement in the fronthaul is 1.6 GHz while using a code-multiplexed approach the bandwidth requirement is 640 MHz. Hence, the code-multiplexed approach provides a 60% gain in terms of bandwidth. In this numerical result we assume 8 users, and an antenna array of 8 elements.

As can be seen from FIGS. 11 and 12, when the SNR at the fronthaul is high enough, the interference caused by spreading with non-orthogonal codes can be kept low while the impact on the demodulation quality is negligible.

The reconfiguration of the spreading codes is then based on a measured quality of the fronthaul link. Signalling including the to-be-used spreading code shall be sent from one resource management node, for example a fronthaul controller. In at least one embodiment, the aggregation node can act as such fronthaul controller.

The foregoing descriptions are only implementation manners of the present invention, the protection of the scope of the present invention is not limited to this. Any variations or replacements can be easily made through person skilled in the art. Therefore, the protection scope of the present invention should be subject to the protection scope of the attached claims.

The invention claimed is:

1. A controller in a radio communication network, the controller comprising:
a processor configured to select a plurality of spreading codes that are non-orthogonal or short orthogonal, and
a transmitter coupled with the processor, wherein the transmitter is configured to notify at least one of an access node or an aggregation node of the plurality of spreading codes, wherein the plurality of spreading codes are used to spread signals transmitted between the access node and the aggregation node.

2. The controller of claim 1, wherein the processor is configured to select the plurality of spreading codes based on a channel quality between the access node and the aggregation node.

3. The controller of claim 2, wherein the transmitter is further configured to request a measurement of the channel quality.

4. The controller of claim 2, wherein the processor is configured to select the plurality of spreading codes based on the channel quality by using a channel quality search look-up-table for the plurality of spreading codes, the channel quality search look-up-table comprises a mapping from a range of channel quality values to a plurality of spreading codes, and the controller further comprises a receiver configured to receive a channel quality value.

* * * * *